Oct. 17, 1939.  M. J. DOUGLAS  2,176,708
MAP HOLDING DEVICE FOR AIRPLANES
Filed Jan. 24, 1939

MARIE JOSEPHINE DOUGLAS
INVENTOR.

BY  John P. Mironov
ATTORNEY.

Patented Oct. 17, 1939

2,176,708

UNITED STATES PATENT OFFICE 2,176,708

MAP HOLDING DEVICE FOR AIRPLANES

Marie Josephine Douglas, Palm Beach, Fla.

Application January 24, 1939, Serial No. 252,589

4 Claims. (Cl. 40—11)

My invention relates to map holding devices for airplanes and has particular reference to devices for supporting maps on a steering wheel of an airplane, automobile or other automotive vehicle.

The pilot of an airplane, as well as the driver of an automobile, usually must have a map before his eyes for a particular territory he is traversing. Map holding devices are sometimes provided for this purpose for mounting maps on the instrument board of an airplane or on the steering post. The most convenient place for holding the map, however, is on the upper side of the steering wheel. One of the objects of my invention is therefore to provide a device for holding the map on the spokes of the steering wheel where the pilot or driver can look at the map with the least interference with his driving. I provide for this purpose a flat board with clamping devices for removably attaching it to the spokes of a steering wheel. As a further improvement, I provide resilient clamps so that the board can be snapped on the spokes when it is desired to use a road map, or quickly removed if not required. For convenience of storing the board in a relatively small compartment on the instrument, I make the board of separate pieces hinged together, so that they can be folded.

Another object of my invention is to provide means to operate the horn button which is usually located at the center of the steering wheel. For this purpose I provide the board with a central aperture so as to expose the button. The latter is covered only by the map and can be operated by pressing against the map with a finger. As a modification I provide resilient mounting for the board which in this case partly rests on the horn button. The latter is operated by pressing the board with the map down.

My invention is more fully described in the accompanying specification and drawing in which.

Figure 1:
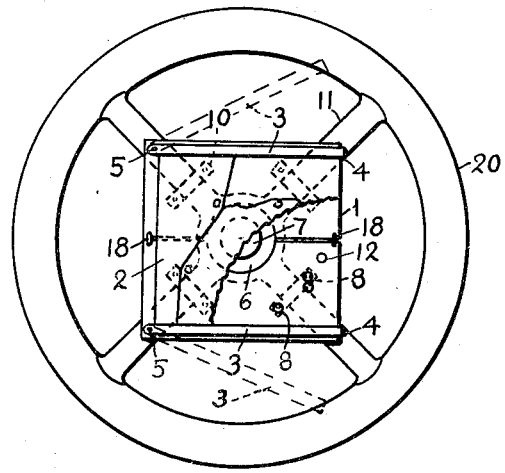
Fig. 1 is a top plan view of a steering wheel with my map holding device, showing also a map, one portion of which is cut away to show more clearly the construction of my device.
Figure 2:
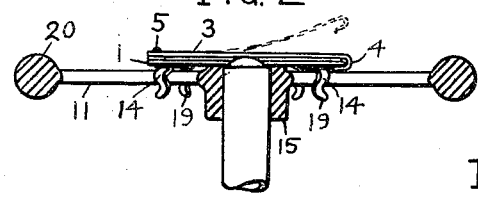
Fig. 2 is a sectional elevation of the steering wheel with my map holding device.
Figure 5:
Fig. 5 is a detail view of a resilient clamp for the map.

My map holding device in one of its embodiments consists of a flat board 1 preferably made of metal or suitable compositions such as fiber, pressed wood, etc. The board may be of a square shape as shown for convenience of holding a map 2. For this purpose resilient clamps 3 are provided hinged at one end to the board by pivots 5 and provided with hooks 4 at the free ends for engaging the edge of the board in the clamping position. The clamps are curved as shown in dotted lines in Fig. 5 so that they press tightly the map against the board when held by the hooks 4. For placing the map on the board, the clamps are turned aside on their pivots 5 as shown in dotted lines in Fig. 1.

The board 1 has a central opening 6 for exposing a horn button 7 at the center of the wheel. The button is covered by the map but can be operated by pushing it down through the map. The board 1 is provided with a number of holes 8 for screws or bolts 9 attaching clamps 10 to the board. The holes are countersunk for the screw-heads in order to keep the top surface of the board smooth.

Figure 3:
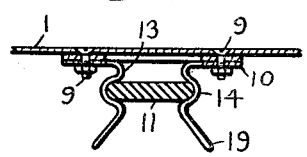
Fig. 3 is a detail view of a clamping device for the map holder.

The holes are spaced for four spokes 11 of the wheel but additional holes 12 are provided for the attachment to a three-spoked wheel. Each clamp has resilient prongs 13 with curved portions 14 for engaging the edges of the spokes as shown in Fig. 3. The portions 14 are spaced from the base of the clamp in order to support the board at a certain height above the spokes. This is necessary in order to provide room under the board for the clamping hooks 4 and, also, because the hub 15 of the wheel is usually slightly higher than the spokes.

Figure 7:
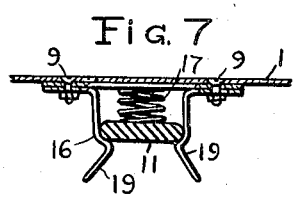
Fig. 7 is a detail view of a modified clamping device for the map holder.

In a modified form of clamps 16 as shown in Fig. 7, springs 17 are placed between the clamps and the spokes in order to resiliently support the board above the spokes. The board in this case may be made solid, without the opening 6 and the horn can be operated by resiliently depressing the board with the map.

Figure 6:
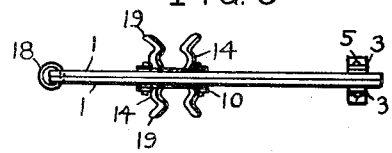
Fig. 6 is a view of the map holding device in the folded position.
Figure 4:
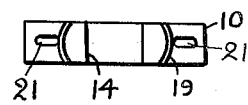
Fig. 4 is a bottom view of the same.

For convenience in storing the board when not in use, it may be made of two halves connected together by hinges 18. The board then can be folded as shown in Fig. 6 for placing it in a map or glove compartment at the instrument board.

The ends 19 of the clamping prongs are spread apart so that the clamps can be resiliently snapped on the spokes, and the board can be removed by simply pulling it off the spokes.

It is understood that my map holding device can be further modified without departing from the spirit of my invention.

I claim as my invention:

1. A map holder comprising a board, means to removably attach the board to the spokes of a steering wheel at its upper side, resilient bars pivotally connected at the ends to the board, and hooks on the ends of the bars adapted to engage the edge of the board thereby holding a map against the board.

2. A map holder comprising a board, means to removably attach the board to the spokes of a steering wheel at its upper side, resilient bars pivotally connected at the ends to the board, and hooks on the ends of the bars adapted to engage the edge of the board thereby holding a map against the board, the board being formed of two portions joined together by hinges and being adapted to be folded when removed from the steering wheel.

3. A map holder for an airplane steering wheel comprising a board consisting of two parts hingedly joined together, means to removably hold a map on the board, and clamping means for removably attaching the board to the spokes of the steering wheel, the board being adapted to be folded when removed from the wheel so as to bring the front sides of the hinged portions together with the clamping means on the outer sides of the hinged portions.

4. A map holder for a steering wheel comprising a board, clamps adapted to support the board at a distance above the spokes and with the middle portion of the board resting on the hub of the wheel, and means to removably hold a map on the board, the board having an opening in the center for a horn button.

MARIE JOSEPHINE DOUGLAS.